(12) United States Patent
Littlefield et al.

(10) Patent No.: US 10,247,252 B2
(45) Date of Patent: Apr. 2, 2019

(54) DOG CLUTCH FOR A VEHICLE TRANSMISSION

(71) Applicant: GM GLOBAL TECHNOLOGY OPERATIONS LLC, Detroit, MI (US)

(72) Inventors: Joseph R Littlefield, Sterling Heights, MI (US); Jonathan Boyd, Royal Oak, MI (US)

(*) Notice: Subject to any disclaimer, the term of this patent is extended or adjusted under 35 U.S.C. 154(b) by 156 days.

(21) Appl. No.: 15/434,496

(22) Filed: Feb. 16, 2017

(65) Prior Publication Data

US 2018/0231063 A1     Aug. 16, 2018

(51) Int. Cl.
*F16D 11/16* (2006.01)
*F16D 11/00* (2006.01)

(52) U.S. Cl.
CPC ........ *F16D 11/16* (2013.01); *F16D 2011/008* (2013.01)

(58) Field of Classification Search
None
See application file for complete search history.

(56) References Cited

U.S. PATENT DOCUMENTS

| | | | | |
|---|---|---|---|---|
| 4,417,650 | A * | 11/1983 | Geisthoff | F16D 43/2028 192/56.1 |
| 5,090,532 | A * | 2/1992 | Bich | F16D 7/048 192/56.1 |
| 5,342,241 | A * | 8/1994 | Kampf | F16D 43/2028 464/37 |
| 6,666,283 | B2 * | 12/2003 | Frauhammer | B25B 23/141 173/93 |
| 8,672,110 | B2 * | 3/2014 | Jaeger | F16D 7/048 192/56.1 |
| 9,151,339 | B2 * | 10/2015 | Lee | F16D 21/00 |
| 10,036,429 | B2 * | 7/2018 | Ince | F16D 13/10 |
| 2012/0234131 | A1 * | 9/2012 | Robinette | F16D 43/18 74/572.2 |
| 2013/0281242 | A1 | 10/2013 | Tolkacz et al. | |

* cited by examiner

*Primary Examiner* — Timothy Hannon

(57) ABSTRACT

A dog clutch for a vehicle transmission includes a driving member configured to rotate about an axis and including a cavity extending radially from the axis, a driving tooth slidably movable within the radially extending cavity, a driven member coaxially surrounding the driving member and including a radially inward extending driven tooth, an actuator coaxially positioned within the driving member and movable along the axis to selectively engage the driving tooth with the driven tooth, and a biasing member radially inwardly biasing the driving tooth into contact with the actuator.

18 Claims, 4 Drawing Sheets

DOG CLUTCH FOR A VEHICLE TRANSMISSION

FIELD

The present disclosure relates to a dog clutch for a vehicle transmission.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Clutches are commonly found in automotive transmissions. Friction clutches are most common, but suffer from a number of disadvantages. Friction clutches suffer from spin losses and pump losses. Friction clutches typically require a high pressure hydraulic system to control operation of the clutch. The energy consumed by the pump(s) that provide the source for high pressure hydraulic fluid can adversely affect the efficiency of a vehicle incorporating a transmission that includes friction clutches and, thus, reduce its fuel economy.

In contrast, a dog clutch provides a selectively actuatable solid connection that does not rely upon friction. Rather, a dog clutch relies upon interference between components of the clutch. Dog clutches also do not suffer from slip. Further, a dog clutch does not require a high pressure hydraulic system to actuate. Thus, dog clutches may provide multiple advantages over a friction clutch.

Another disadvantage with a dog clutch is that they may be difficult to disconnect or disengage, especially while under load. The centrifugal force acting on the teeth resist any radially inward motion of the teeth, thereby, making disengagement sometimes unreliable.

Additionally, even when disengaged, the centrifugal force exerted on the teeth in a radially applied dog clutch cause them to move radially outward. This results in undesirable contact between these teeth and the outer driven teeth which may be a significant source of noise (ratcheting noise) and a cause for spin losses which adversely affects the overall efficiency of the system and resulting loss in fuel economy.

SUMMARY

In an exemplary aspect, a dog clutch for a vehicle transmission includes a driving member configured to rotate about an axis and including a cavity extending radially from the axis, a driving tooth slidably movable within the radially extending cavity, a driven member coaxially surrounding the driving member and including a radially inward extending driven tooth, an actuator coaxially positioned within the driving member and movable along the axis to selectively engage the driving tooth with the driven tooth, and a biasing member radially inwardly biasing the driving tooth into contact with the actuator.

In another exemplary aspect, the driving member further includes a plurality of radially extending cavities and the driven member comprises a plurality of radially inward extending driven teeth, the clutch further includes a plurality of driving teeth each slidably movable within a corresponding one of the plurality radially extending cavities, wherein the actuator is movable along the axis to selectively engage the driving teeth with the driven teeth, and a plurality of biasing members each radially inwardly biasing a driving tooth into contact with the actuator.

In another exemplary aspect, the biasing member includes a helical coil spring surrounding the driving tooth.

In another exemplary aspect, the driving member further includes a groove within the radially extending cavity.

In another exemplary aspect, the dog clutch further includes a spring retainer positioned within the groove and abutting a radially distal end of the helical coil spring.

In another exemplary aspect, the driving tooth includes a landing abutting a radially proximal end of the helical coil spring.

In another exemplary aspect, the biasing member is a leaf spring.

In another exemplary aspect, the leaf spring is positioned on an outer circumferential surface of the driving member.

In another exemplary aspect, the driving tooth includes a roller ball in contact with the actuator.

In another exemplary aspect, the actuator includes an actuator shaft movable along the axis and including a swaged end, a spring retainer on the actuator shaft, a bullet actuator slidably and coaxially mounted on the actuator shaft adjacent the swaged end, and a biasing spring coaxially mounted on the actuator shaft and positioned between the bullet actuator and the spring retainer.

In this manner, the present invention provides all of the advantages of a dog clutch over a friction clutch (obviating friction losses and pumping losses) while enabling an easier, more consistent, more controllable, and reliable disengagement and minimizing or preventing ratcheting noises and spin losses, thereby significantly improving efficiency, fuel economy and reducing noise.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
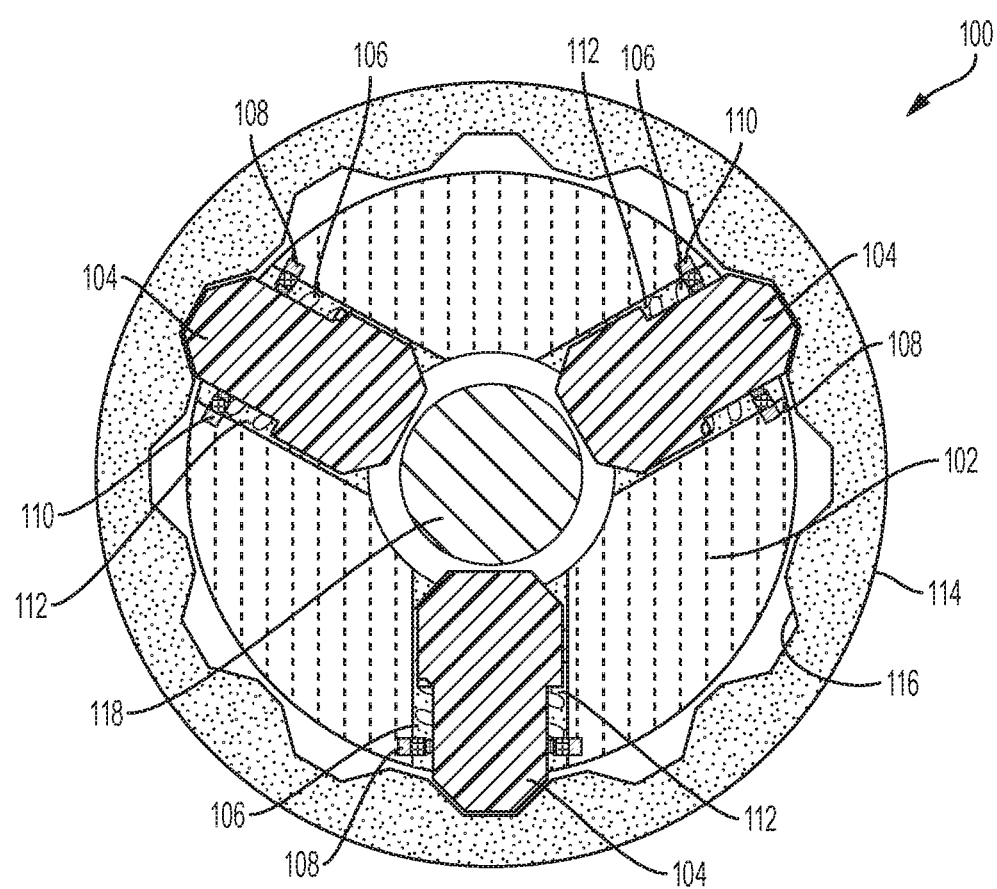
FIG. 1 is a cross-sectional view in an axial direction of an exemplary dog clutch in accordance with the present invention.

FIG. 1 is a cross-sectional view in an axial direction of an exemplary dog clutch 100 in accordance with the present invention. The dog clutch 100 includes a driving member 102 supporting radially movable teeth 104. Each tooth 104 is biased radially inwardly by a biasing member 106. In the particular embodiment illustrated by FIG. 1, the biasing members 106 are helically coiled springs which are captured between spring retainer 108, which are each positioned within a groove 110 in the driving member 102 circumferentially surrounding each corresponding tooth 104, and a landing 112 on each tooth. The dog clutch 100 further includes a driven member 114 with a plurality of radially inwardly facing driven teeth 116 and a selectively actuatable actuator 118.

Figure 2A:
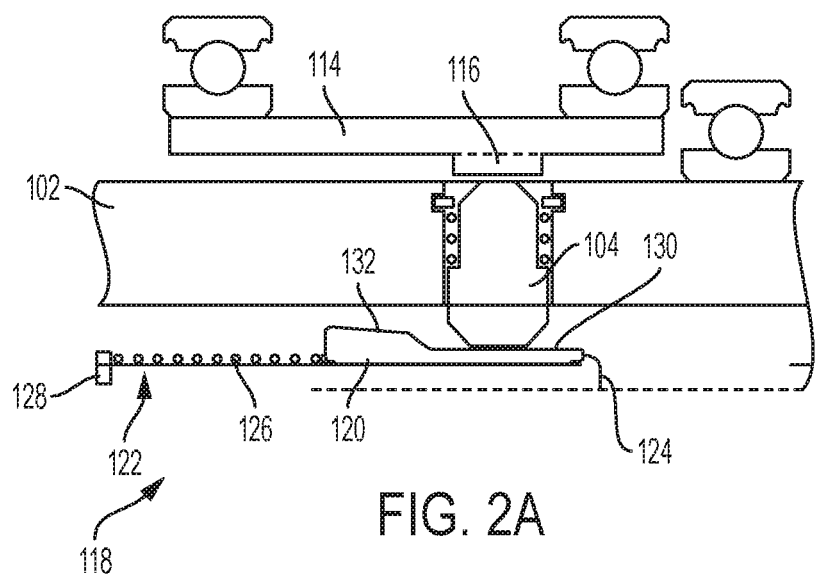
FIG. 2A is a cross-sectional view in a radial direction of a portion of the dog clutch of FIG. 1 in a disengage configuration.
Figure 2B:
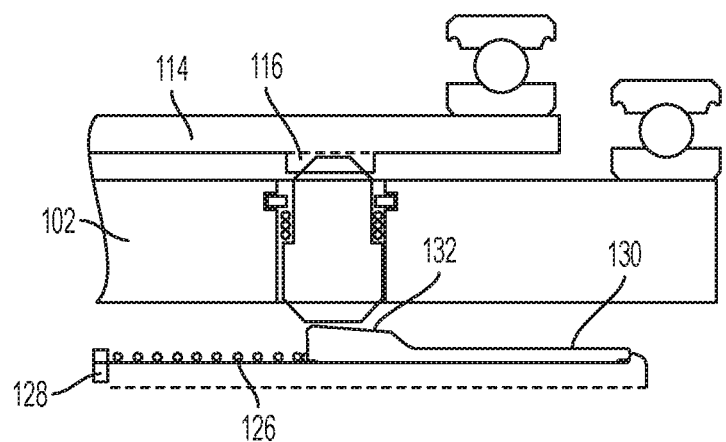
FIG. 2B is a cross-sectional view of a portion of the dog clutch of FIG. 1 in an engage configuration.

Referring now to FIGS. 1 through 2B, operation of the dog clutch 100 and additional detail regarding the actuator 118 is explained. The actuator 118 includes a bullet actuator 120 concentrically mounted on an actuating shaft 122. One end of the actuating shaft 122 includes a swage 124 which prevents the bullet actuator 120 from moving off the end of the actuating shaft 122. A biasing spring 126 is coaxially mounted on the actuating shaft 122 and is captured between the bullet actuator 120 and a retainer 128.

FIG. 2A illustrates a disengaged configuration where the actuating shaft 122 is positioned such that the teeth 104 are biased into contact with a disengagement landing 130 on the bullet actuator 120. In this configuration, the teeth 104 do not engage driven teeth 116 of the driven member 114. Thus, the driving member 102 may rotate freely without engaging the driven member 114.

To transition from the disengaged configuration of FIG. 2A to an engaged configuration of FIG. 2B, the actuating shaft 122 axially moves to the right relative to FIGS. 2A and 2B, which moves the retainer 128 to the right and compresses the biasing spring 126 which causes the bullet actuator 120 to move to the right. As the bullet actuator 120 moves to the right, the teeth 104 slide along the camming surface of the bullet actuator 120 from the disengagement landing 130 to the engagement landing 132. This causes the teeth 104 to move radially outward against the biasing force of the biasing members 106 and into engagement with driven teeth 116 of the driven member 114. In this manner, the driven member 114 is caused to rotatably move with the rotating motion of the driving member 102.

To transition from the engaged configuration of FIG. 2B to the disengaged configuration of FIG. 2A, the actuating shaft 122 axially moves to the left (in FIGS. 2A and 2B). The swage 124 pulls the bullet actuator 120 to the left which enables the teeth 104 to slide along the camming surface of the bullet actuator from the engagement landing 132 to the disengagement landing 130 which permits the biasing members 106 to positively force the teeth 104 out of engaging contact with the driven teeth 116. The biasing members 106 provide a significant advantage over conventional radially applied dog clutch designs because the biasing members 106 overcome the centrifugal force pulling the teeth 104 radially outward and thereby enable positive control over the disengagement of the teeth 104 from the driven teeth 116.

The engagement landing 132 optionally and preferably includes a slight slope which provides a fuse function which enables the bullet actuator 120 to slide left on the actuating shaft 122, against the biasing spring 126 to move the teeth 104 from contact with the engagement landing 132 to the disengagement landing 130 when the dog clutch 100 is overloaded. In the absence of an overload condition, the biasing spring 126 biases the bullet actuator 120 against the swage 124 which serves to prevent the teeth 104 from sliding down (camming down) from the engagement landing 132 to the disengagement landing 130.

Figure 3:
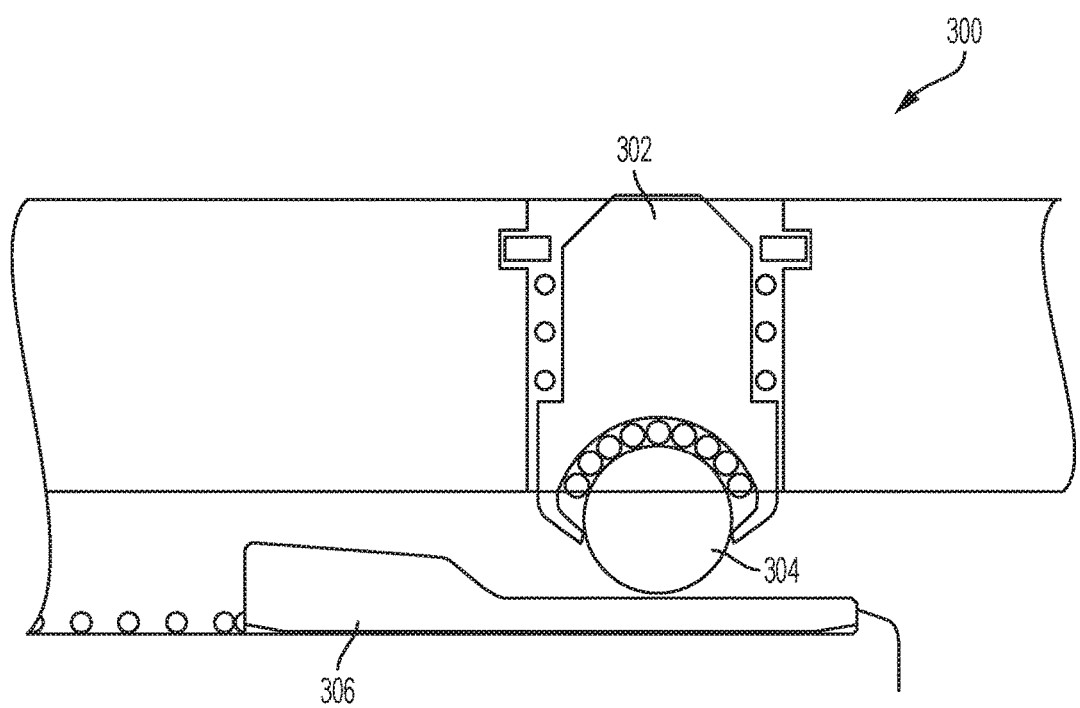
FIG. 3 is a cross-sectional view of a portion of an exemplary dog clutch with a tooth including a roller ball in accordance with the present invention.

FIG. 3 is a cross-sectional view of another exemplary dog clutch 300 with a tooth 302 that includes a roller ball 304. The roller ball 304 is captured in an end of the tooth 302 such that the roller ball 304 contacts the bullet actuator 306. In contrast, with the dog clutch 100 described previously with reference to FIGS. 1 through 2B, the roller ball 304 reduces the friction between the tooth 302 and the bullet actuator 306.

Figure 4:
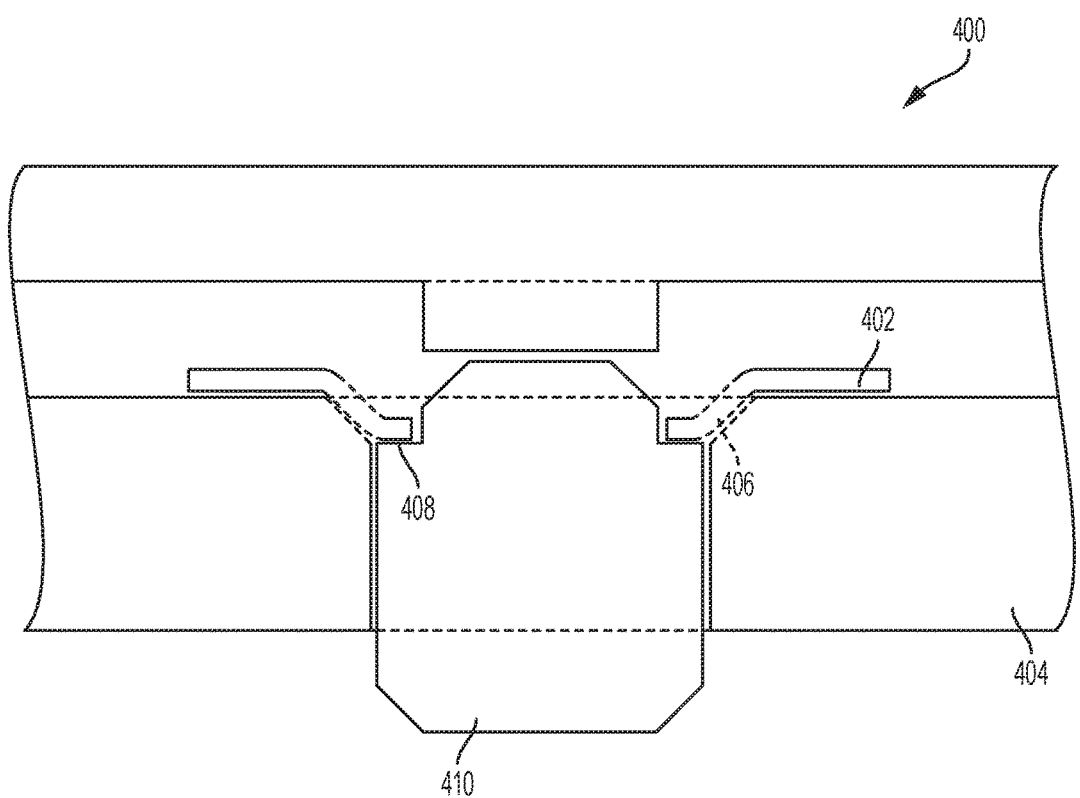
FIG. 4 is a cross-sectional view of a portion of an exemplary dog clutch with a leaf style biasing spring.

FIG. 4 is a cross-sectional view of a portion of another exemplary dog clutch 400 with a leaf style biasing spring 402. The leaf style biasing spring 402 is positioned on a radially external surface of driving member 404 and includes radially inwardly sloping tooth capturing extensions 406 that abut landing surfaces 408 on the dog teeth 410. The leaf style biasing spring 402 serves the same function as the helically coiled biasing springs illustrated and described above in relation to FIGS. 1 through 3. In general, any biasing member which serves to bias the teeth of the dog clutch radially inwardly to counteract the centrifugal force trying to pull the teeth radially outwardly and to, thereby, provide a reliable and consistent structure to ensure disengagement when desired forms a part of the present invention.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A dog clutch for a vehicle transmission, the clutch comprising:
   a driving member configured to rotate about an axis and including a cavity extending radially from the axis;
   a driving tooth slidably movable within the radially extending cavity;
   a driven member coaxially surrounding the driving member and including a radially inward extending driven tooth;
   an actuator coaxially positioned within the driving member and movable along the axis to selectively engage the driving tooth with the driven tooth; and
   a biasing member radially inwardly biasing the driving tooth into contact with the actuator.

2. The dog clutch of claim 1, wherein the biasing member comprises a helical coil spring surrounding the driving tooth.

3. The dog clutch of claim 2, wherein the driving member further includes a groove within the radially extending cavity.

4. The dog clutch of claim 3, further comprising a spring retainer positioned within the groove and abutting a radially distal end of the helical coil spring.

5. The dog clutch of claim 3, wherein the driving tooth includes a landing abutting a radially proximal end of the helical coil spring.

6. The dog clutch of claim 1, wherein the biasing member comprises a leaf spring.

7. The dog clutch of claim 6, wherein the leaf spring is positioned on an outer circumferential surface of the driving member.

8. The dog clutch of claim 1, wherein the driving tooth comprises a roller ball in contact with the actuator.

9. The dog clutch of claim 1, wherein the actuator comprises:

an actuator shaft movable along the axis and including a swaged end;

a spring retainer on the actuator shaft;

a bullet actuator slidably and coaxially mounted on the actuator shaft adjacent the swaged end; and a biasing spring coaxially mounted on the actuator shaft and positioned between the bullet actuator and the spring retainer.

10. A vehicle transmission comprising:

a driving member configured to rotate about an axis and including a cavity extending radially from the axis;

a driving tooth slidably movable within the radially extending cavity;

a driven member coaxially surrounding the driving member and including a radially inward extending driven tooth;

an actuator coaxially positioned within the driving member and movable along the axis to selectively engage the driving tooth with the driven tooth; and a biasing member radially inwardly biasing the driving tooth into contact with the actuator.

11. The transmission of claim 10, wherein the biasing member comprises a helical coil spring surrounding the driving tooth.

12. The transmission of claim 11, wherein the driving member further includes a groove within the radially extending cavity.

13. The transmission of claim 12, further comprising a spring retainer positioned within the groove and abutting a radially distal end of the helical coil spring.

14. The transmission of claim 12, wherein the driving tooth includes a landing abutting a radially proximal end of the helical coil spring.

15. The transmission of claim 10, wherein the biasing member comprises a leaf spring.

16. The transmission of claim 15, wherein the leaf spring is positioned on an outer circumferential surface of the driving member.

17. The transmission of claim 10, wherein the driving tooth comprises a roller ball in contact with the actuator.

18. The transmission of claim 10, wherein the actuator comprises:

an actuator shaft movable along the axis and including a swaged end;

a spring retainer on the actuator shaft;

a bullet actuator slidably and coaxially mounted on the actuator shaft adjacent the swaged end; and a biasing spring coaxially mounted on the actuator shaft and positioned between the bullet actuator and the spring retainer.

\* \* \* \* \*